United States Patent
Yang

(10) Patent No.: US 10,437,420 B2
(45) Date of Patent: Oct. 8, 2019

(54) METHOD AND APPARATUS FOR SETTING BACKGROUND PICTURE OF UNLOCKING INTERFACE OF APPLICATION, AND ELECTRONIC DEVICE

(71) Applicant: BEIJING KINGSOFT INTERNET SECURITY SOFTWARE CO., LTD., Beijing (CN)

(72) Inventor: Shiduo Yang, Beijing (CN)

(73) Assignee: BEIJING KINGSOFT INTERNET SECURITY SOFTWARE CO. LTD., Beijing (CN)

( * ) Notice: Subject to any disclaimer, the term of this patent is extended or adjusted under 35 U.S.C. 154(b) by 81 days.

(21) Appl. No.: 15/756,877

(22) PCT Filed: Sep. 14, 2015

(86) PCT No.: PCT/CN2015/089508
§ 371 (c)(1),
(2) Date: Mar. 1, 2018

(87) PCT Pub. No.: WO2016/197470
PCT Pub. Date: Dec. 15, 2016

(65) Prior Publication Data
US 2019/0095075 A1  Mar. 28, 2019

(30) Foreign Application Priority Data
Jun. 11, 2015  (CN) .......................... 2015 1 0319547

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0482* (2013.01); *G06F 21/36* (2013.01);
(Continued)

(58) Field of Classification Search
None
See application file for complete search history.

(56) References Cited

U.S. PATENT DOCUMENTS 8,223,165 B1 * 7/2012 Jitkoff .................. G06T 3/0012
345/581
2002/0000998 A1 * 1/2002 Scott ..................... G06T 3/4084
345/667
(Continued)

FOREIGN PATENT DOCUMENTS

CN    102147701    8/2011
CN    102402661    4/2012
(Continued)

OTHER PUBLICATIONS

SIPO, First Office Action for CN Application No. 201510319547, dated Jun. 2, 2017.
(Continued)

*Primary Examiner* — Hua Lu
(74) *Attorney, Agent, or Firm* — Hodgson Russ LLP

(57) ABSTRACT

Disclosed are a method and apparatus for setting a background picture of an unlocking interface of an application, and an electronic device. The method includes: acquiring a first icon file of an application to be unlocked; performing a scaling processing on the first icon file, so as to acquire a second icon file with a preset image size; performing a special effect processing on the second icon file, so as to acquire a special effect picture, and storing the special effect picture in a preset storing location; and calling, when an instruction for generating the unlocking interface of the application to be unlocked is detected, a special effect picture relevant to the application to be unlocked currently, scaling-up the special effect picture to acquire a first scaled-up special effect picture and displaying partial content of the
(Continued)

first scaled-up special effect picture as the background picture of the unlocking interface.

20 Claims, 7 Drawing Sheets

(51) Int. Cl.
    *G06F 21/36*      (2013.01)
    *G06F 3/0482*      (2013.01)
    *G06T 3/40*      (2006.01)
    *G06T 5/00*      (2006.01)
    *G06F 21/84*      (2013.01)

(52) U.S. Cl.
    CPC ................ *G06T 3/40* (2013.01); *G06T 5/002* (2013.01); *G06F 21/84* (2013.01)

(56) References Cited

U.S. PATENT DOCUMENTS

| | | | |
|---|---|---|---|
| 2008/0198175 A1* | 8/2008 | Sun | H04N 1/3876 345/629 |
| 2009/0006991 A1* | 1/2009 | Lindberg | G06F 3/04817 715/763 |
| 2009/0115901 A1* | 5/2009 | Winter | H04N 5/262 348/565 |
| 2009/0274363 A1* | 11/2009 | Dai | G06K 9/00456 382/164 |
| 2010/0269040 A1* | 10/2010 | Lee | G06F 3/04817 715/702 |
| 2010/0316290 A1* | 12/2010 | Jia | G06K 9/4652 382/165 |
| 2011/0187727 A1* | 8/2011 | Ahn | G06F 3/04883 345/473 |
| 2012/0063740 A1* | 3/2012 | Lee | H04N 13/20 386/230 |
| 2012/0185803 A1 | 7/2012 | Wang et al. | |
| 2012/0240071 A1* | 9/2012 | Park | G06F 3/0488 715/769 |
| 2012/0313956 A1* | 12/2012 | Zhou | G06T 11/00 345/582 |
| 2013/0111379 A1* | 5/2013 | Hong | G06F 3/04883 715/764 |
| 2013/0191910 A1* | 7/2013 | Dellinger | G06F 3/0488 726/19 |
| 2013/0235071 A1* | 9/2013 | Ubillos | G06F 3/0484 345/600 |
| 2013/0239058 A1* | 9/2013 | Yao | G06F 3/04883 715/833 |
| 2013/0329006 A1* | 12/2013 | Boles | H04N 1/40056 348/42 |
| 2014/0173700 A1* | 6/2014 | Awan | H04L 63/107 726/4 |
| 2014/0267120 A1* | 9/2014 | Zhang | G06F 3/0484 345/173 |
| 2015/0091903 A1* | 4/2015 | Costello | G06T 15/20 345/426 |
| 2015/0235387 A1* | 8/2015 | Du | G06T 11/001 345/594 |
| 2015/0334219 A1* | 11/2015 | Soundararajan | H04M 1/67 455/414.1 |
| 2015/0370438 A1* | 12/2015 | Ito | G06F 3/0488 715/750 |
| 2016/0048979 A1* | 2/2016 | Xu | G06F 3/04817 345/592 |
| 2016/0063723 A1* | 3/2016 | Choi | G06K 9/4652 382/282 |
| 2016/0196665 A1* | 7/2016 | Abreu | G06T 11/00 345/427 |
| 2016/0253047 A1* | 9/2016 | Kim | G06F 3/0487 715/764 |
| 2016/0364888 A1* | 12/2016 | Jeon | G09G 3/2003 |
| 2017/0300700 A1* | 10/2017 | Li | G06F 3/04883 |

FOREIGN PATENT DOCUMENTS

| | | |
|---|---|---|
| CN | 103186346 | 7/2013 |
| CN | 103246453 | 8/2013 |
| CN | 103778381 | 5/2014 |
| CN | 104090711 | 10/2014 |
| CN | 104267891 | 1/2015 |
| CN | 104331220 | 2/2015 |
| CN | 104463787 | 3/2015 |
| CN | 104866755 | 8/2015 |

OTHER PUBLICATIONS

SIPO, Second Office Action for CN App. No. 201510319547, dated Dec. 4, 2017.
WIPO, ISR/WO for PCT/CN2015/089508, dated Feb. 29, 2016.

* cited by examiner

METHOD AND APPARATUS FOR SETTING BACKGROUND PICTURE OF UNLOCKING INTERFACE OF APPLICATION, AND ELECTRONIC DEVICE

CROSS REFERENCE TO RELATED APPLICATION

This application is a U.S. national phase application of International Application No. PCT/CN2015/089508, filed on Sep. 14, 2015, which claims priority to and benefits of Chinese Patent Application No. 201510319547.2, filed with State Intellectual Property Office on Jun. 11, 2015, which is entitled as "Method and apparatus for setting background picture of unlocking interface of application program, and electronic device", the entire content of which is incorporated herein by reference.

FIELD

The present disclosure relates to a picture processing field, and more particularly to a method and an apparatus for setting a background picture of an unlocking interface of an application, and an electronic device.

BACKGROUND

For privacy protection, the user may install software capable for locking applications installed on a terminal device on the terminal device, such that the user may lock the applications according to his or her requirement. For example, the user may use the application locking software to lock a certain application installed on a mobile phone, and when the user uses the above certain application, a display interface of the mobile phone is redirected to an unlocking information inputting interface from a current display interface, so as to prompt the user to input the unlocking information. After the application locking software receives the unlocking information and determines that the unlocking information is correct, an operation for launching the above certain application may be performed.

In the existing application unlocking software, a background picture of the unlocking information inputting interface is usually a static picture uncorrelated with the application to be unlocked. The user is unable to determine which application is currently to be unlocked according to the unlocking information inputting interface.

SUMMARY

In order to solve the above problems, embodiments of the present disclosure disclose a method and an apparatus for setting a background picture of an unlocking interface of an application, and an electronic device. The technical solutions are described as follows.

Embodiments of the present disclosure disclose a method for setting a background picture of an unlocking interface of an application. The method includes: acquiring a first icon file of an application to be unlocked; performing a scaling processing on the first icon file of the application to be unlocked, so as to acquire a second icon file with a preset image size; performing a special effect processing on the second icon file, so as to acquire a special effect picture, and storing the special effect picture in a preset storing location; and calling, when an instruction for generating the unlocking interface of the application to be unlocked is detected, a special effect picture relevant to the application to be unlocked currently, and displaying partial content of a scaled-up special effect picture as the background picture of the unlocking interface.

Embodiments of the present disclosure provide an apparatus for setting a background picture of an unlocking interface of an application. The apparatus includes: an icon acquiring module, configured to acquire a first icon file of an application to be unlocked; a size processing module, configured to perform a scaling processing on the first icon file of the application to be unlocked acquired by the icon acquiring module, so as to acquire a second icon file with a preset image size; a special effect processing module, configured to perform a special effect processing on the second icon file acquired by the size processing module, so as to acquire a special effect picture, and to store the special effect picture in a preset storing location; and an unlocking background displaying module, configured to call, when an instruction for generating the unlocking interface of the application to be unlocked is detected, a special effect picture relevant to the application to be unlocked currently, and to display partial content of a scaled-up special effect picture as the background picture of the unlocking interface.

The present disclosure provides an electronic device, including: a housing, a processor, a memory, a display, a circuit board and a power supply circuit, in which the circuit board is disposed in an inner space enclosed by the housing, the processor and the memory are both mounted on the circuit board; the power supply circuit supplies power to the circuits or components of the electronic device; the memory stores executable program code; and the processor executes a program corresponding to the executable program code by reading the executable program code stored in the memory, so as to perform following steps: acquiring a first icon file of an application to be unlocked; performing a scaling processing on the first icon file of the application to be unlocked, so as to acquire a second icon file with a preset image size; performing a special effect processing on the second icon file, so as to acquire a special effect picture, and storing the special effect picture in a preset storing location; and calling, when an instruction for generating the unlocking interface of the application to be unlocked is detected, a special effect picture relevant to the application to be unlocked currently, and displaying partial content of a scaled-up special effect picture as the background picture of the unlocking interface.

In order to realize the above objects, embodiments of the present disclosure also provide a storage medium, configured to store an application program, the application program is configured to execute a method for setting a background picture of an unlocking interface of an application according to the present disclosure at running time.

In order to realize the above objects, embodiments of the present disclosure provide an application program, the application program is configured to execute the method for setting a background picture of an unlocking interface of an application according to the present disclosure at running time.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings

DETAILED DESCRIPTION

For a better understanding of the present disclosure for the skilled in the art, the technical solutions in embodiments of the present invention are hereinafter described clearly and completely with reference to accompanying drawings in embodiments of the present invention. Apparently, embodiments described are a part of embodiments of the present invention, but not all embodiments. All other embodiments obtained by those skilled in the art based on the embodiments in the present invention without creative labor shall fall in the protection scope of the present invention.

For privacy protection, the user may install software capable for locking applications installed on a terminal device on the terminal device, such that the user may lock the applications according to his or her requirement. For example, the user may use the application locking software to lock a certain application installed on a mobile phone, and when the user uses the above certain application, a display interface of the mobile phone is redirected to an unlocking information inputting interface from a current display interface, so as to prompt the user to input the unlocking information. After the application locking software receives the unlocking information and determines that the unlocking information is correct, an operation for launching the above certain application may be performed.

In the existing application unlocking software, a background picture of the unlocking information inputting interface is usually a static picture uncorrelated with the application to be unlocked. The user is unable to determine which application is currently to be unlocked according to the unlocking information inputting interface. In order to solve the above problems, embodiments of the present disclosure disclose a method and an apparatus for setting a background picture of an unlocking interface of an application, and an electronic device.

Firstly, a method for setting a background picture of an unlocking interface of an application provided by embodiments of the present disclosure will be described as follows.

It should be noted that, the method provided by the present disclosure is applied to a mobile terminal. In a practical application, the mobile terminal may include: a touch-screen device such as a smart phone, a tablet and the like.

Figure 1:
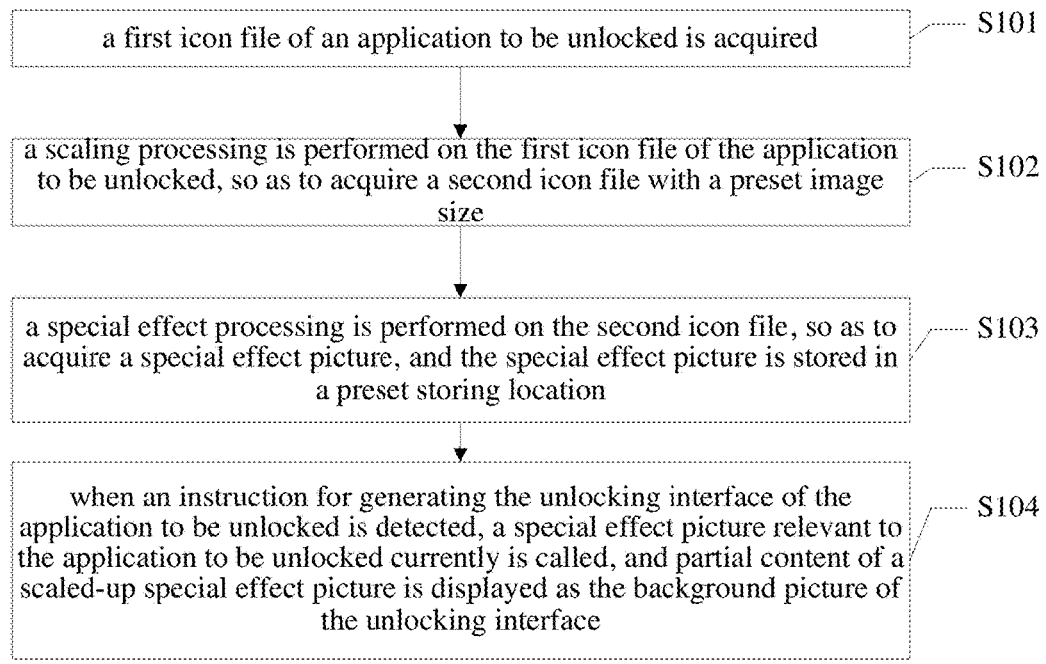
FIG. 1 is a flow chart of a method for setting a background picture of an unlocking interface of an application provided by an embodiment of the present disclosure.

As shown in FIG. 1, the method for setting a background picture of an unlocking interface of an application may include following acts.

At block S101, a first icon file of an application to be unlocked is acquired.

Figure 2A:
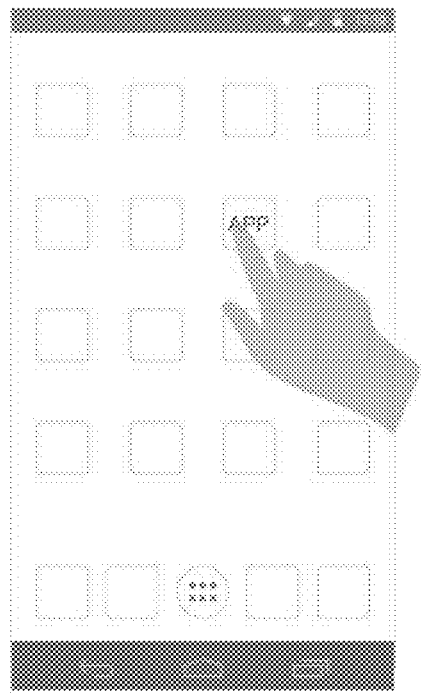
FIG. 2(a) is a schematic diagram illustrating a manner for selecting an application provided by an embodiment of the present disclosure.

In the present disclosure, when it is detected that a user selects the application to be unlocked, the icon file of the application to be unlocked may be acquired. For example, as shown in FIG. 2(a), when the user clicks the icon of the application on the display interface, the terminal device may detect the application to be unlocked corresponding to the icon, so as to acquire the icon file of the application.

Alternatively, before the application to be unlocked is selected, the icon file of the application to be unlocked may be acquired in advance, which will be not limited in the present disclosure.

At block S102, a scaling processing is performed on the first icon file of the application to be unlocked, so as to acquire a second icon file with a preset image size.

It may be understood that, as the icon files of the applications provided by different application developers may have different sizes, for a utility of a display effect of the applications to be unlocked, after the icon file of the application to be unlocked is acquired, the scaling processing needs to be performed on the icon file of the application to be unlocked to scale the icon file to a certain size, so as to acquire a second icon file with a preset image size.

In an implementation, the act at block S102 may include: acquiring a standard image by using a Bitmap function, and scaling the first icon file of the application to the standard image, so as to acquire the second icon file with the preset image size, in which, a size value of the standard image equals to a preset first size value.

For example, the Bitmap function in Android system may be used, a 48×48 image is prepared in advance and the icon file of the application is scaled into the 48×48 image.

In an implementation, the preset first size value according to embodiments of the present disclosure may include a length value and a width value of a picture, in which the length value equals to the width value.

At block S103, a special effect processing is performed on the second icon file, so as to acquire a special effect picture, and the special effect picture is stored in a preset storing location.

In the present disclosure, the special effect processing may be a blur processing, such that the picture has a soft display effect. In an implementation, the blur processing technology may be Gaussian blur processing technology.

Figure 2B:
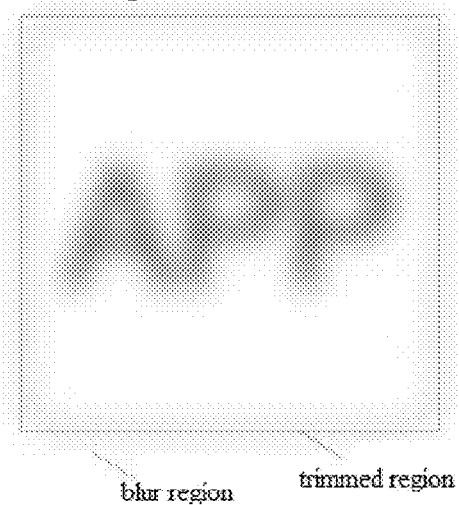
FIG. 2(b) is a picture without undergoing an edge extending processing provided by an embodiment of the present disclosure.
Figure 3:
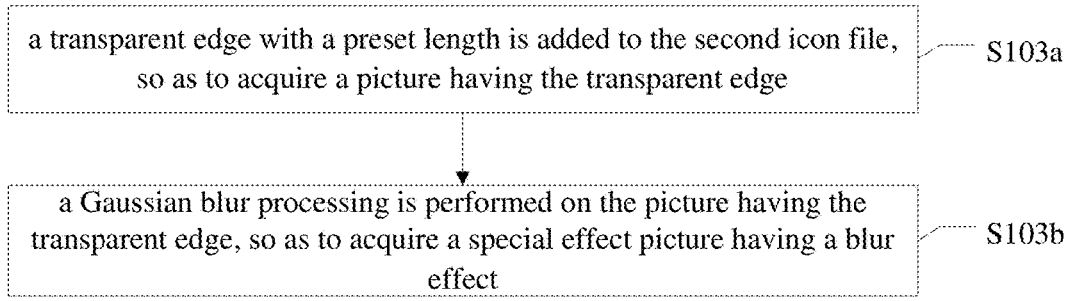
FIG. 3 is a flow chart illustrating an implementation of the act at block S103 provided by an embodiment of the present disclosure.

It should be noted that, the edge of the picture will be trimmed as shown in FIG. 2(b) when the Gaussian blur processing is performed on the picture. To solve the problem, as shown in FIG. 3, the act at block S102 may include followings.

At block S103a, a transparent edge with a preset length is added to the second icon file, so as to acquire a picture having the transparent edge.

At block S103b, a Gaussian blur processing is performed on the picture having the transparent edge, so as to acquire a special effect picture having a blur effect.

Figure 2C:
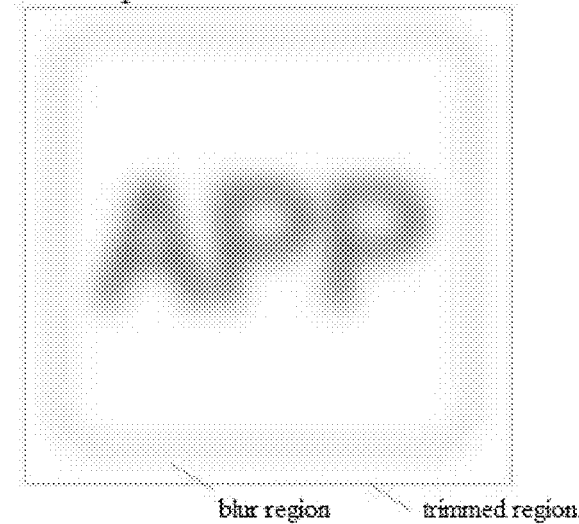
FIG. 2(c) is a picture undergoing an edge extending processing provided by an embodiment of the present disclosure.

For example, a 30 px transparent edge may be added to the picture to be processed under the Gaussian blur processing, thus avoiding the trimming problem occurring in the edge of the picture undergoing the bur processing, as shown in FIG. 2(c).

Furthermore, the processed special effect pictures are pre-stored, when the background of the unlocking interface needs to be displayed, the special effect picture may be called directly, such that the resource-consuming problem when performing the blur processing in real time may be solved.

At block S104, when an instruction for generating the unlocking interface of the application to be unlocked is detected, a special effect picture relevant to the application to be unlocked currently is called, and partial content of a scaled-up special effect picture is displayed as the background picture of the unlocking interface.

Since the special effect picture processed at block S103 may have an image of the icon of the application to be unlocked and have a blur frosted-glass effect, this special effect picture regarded as the unlocking background may directly display the application to be unlocked currently.

Therefore, with the method for setting a background picture of an unlocking interface of an application provided by embodiments of the present disclosure, after an icon file of an application to be unlocked is acquired, a scaling processing may be performed on the icon file of the application to be unlocked, so as to acquire a second icon file with a preset image size. A special effect processing may be performed on the second icon file, so as to acquire a special effect picture, and the special effect picture may be stored in a preset storing location. When an instruction for generating the unlocking interface of the application is detected, a special effect picture relevant to the application to be unlocked currently may be called, and partial content of a scaled-up special effect picture may be displayed as the background picture of the unlocking interface.

Compared to the prior art, by using embodiments of the present disclosure, a picture relevant to an application to be unlocked may be used as an unlocking background of an unlocking information inputting interface of the application. The user is able to determine the application to be unlocked currently according to only the unlocking information inputting interface. Further, with the embodiments of the present disclosure, a special effect processing can be performed on the picture relevant to the application. By using a picture having a special effect as the unlocking background, the user is provided with a viewing-friendly unlocking interface. Furthermore, the processed special effect picture can be pre-stored, and when the background of the unlocking interface needs to be displayed, the special effect picture may be called directly, such that the resource-consuming problem when performing the blur processing in real time may be solved.

Figure 4:
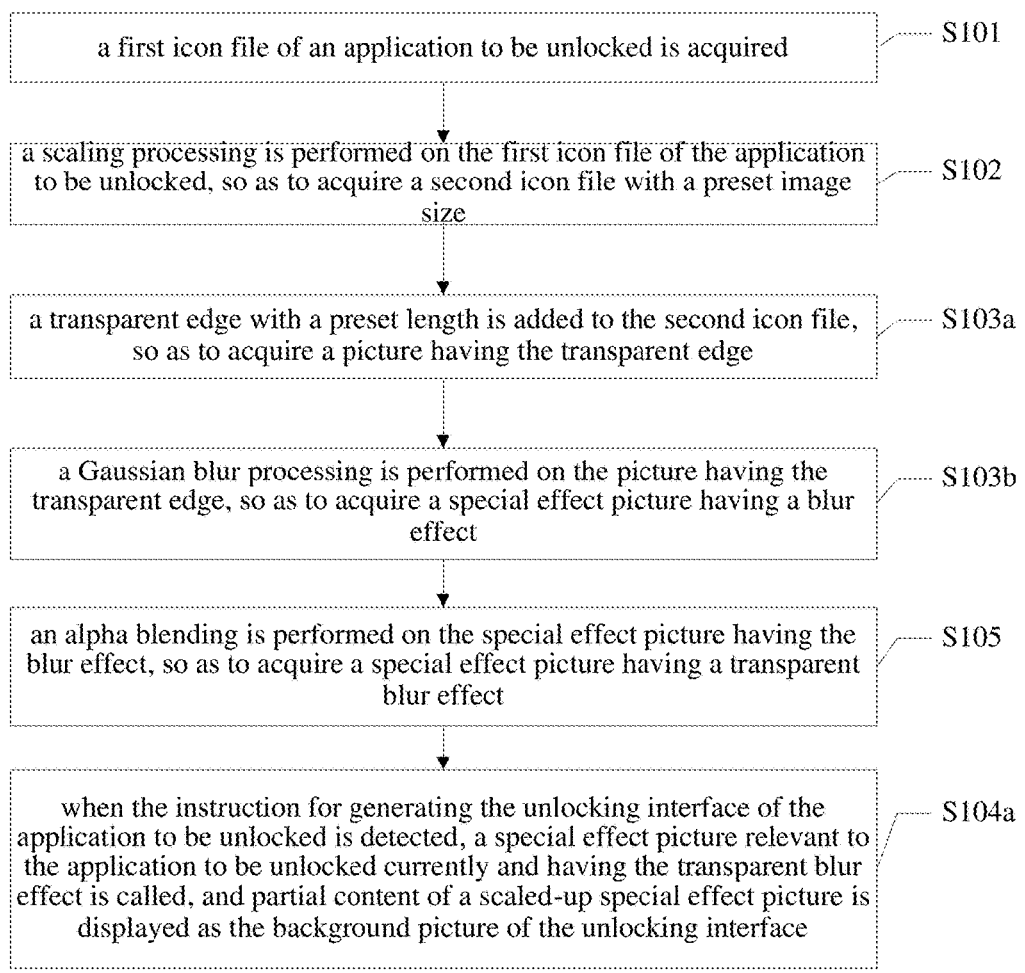
FIG. 4 is a flow chart of a method for setting a background picture of an unlocking interface of an application provided by another embodiment of the present disclosure.

Alternatively, in another embodiment of the present disclosure, as shown in FIG. 4, the method for setting a background picture of an unlocking interface of an application provided by embodiments of the present disclosure may include: acts at block S101, block S102, block S103a, block S103b, block S105 and block S104a, in which the acts at block S101, block S102, block S103a and block S103b are described in the method embodiment as shown in FIG. 1, which will not be described herein, and the act at block S104a is a specific implementation of the act at block S104 shown in FIG. 1. The acts at block S105 and block S104a will be described below in detail.

At block S101, a first icon file of an application to be unlocked is acquired.

At block S102, a scaling processing is performed on the first icon file of the application to be unlocked, so as to acquire a second icon file with a preset image size.

At block S103a, a transparent edge with a preset length value is added to the second icon file, so as to acquire a picture having the transparent edge.

At block S103b, a Gaussian blur processing is performed on the picture having the transparent edge, so as to acquire a special effect picture having a blur effect.

At block S105, an alpha blending is performed on the special effect picture having the blur effect, so as to acquire a special effect picture having a transparent blur effect.

The alpha blending is a technology used for making an object to have a transparent effect, like a blur transparent scene when viewing through water or glasses. In the present disclosure, the special effect picture is processed using this technology, so as to acquire an optimized virtual transparent effect.

At block S104a, when the instruction for generating the unlocking interface of the application to be unlocked is detected, a special effect picture relevant to the application to be unlocked currently and having the transparent blur effect is called, and partial content of a scaled-up special effect picture is displayed as the background picture of the unlocking interface.

Since the special effect picture processed at block S105 may have an image of the icon of the application to be unlocked and have a blur frosted-glass effect and a transparent effect, this special effect picture regarded as the unlocking background may directly display the application to be unlocked currently, and a virtual transparent effect may be shown.

Figure 5:
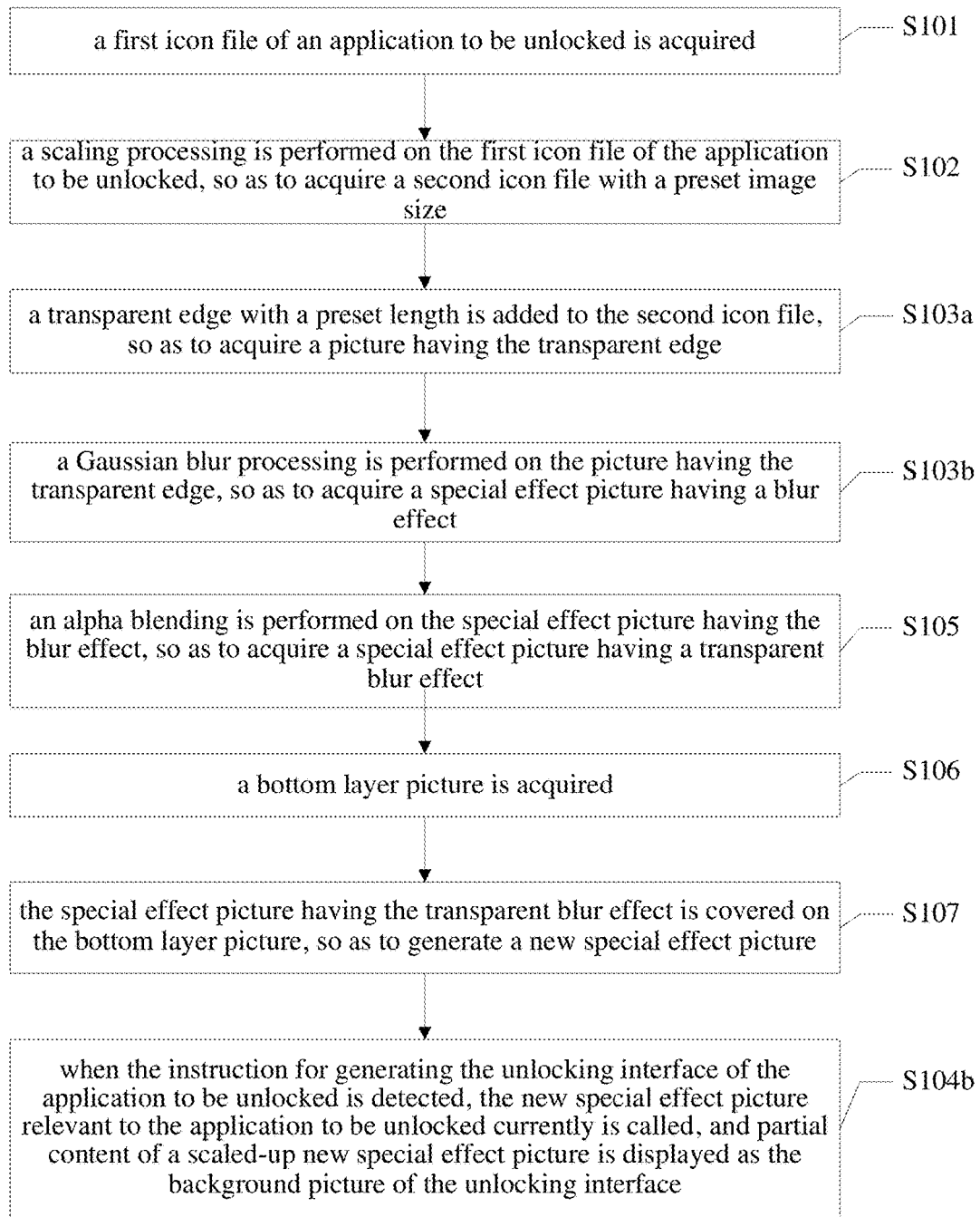
FIG. 5 is a flow chart of a method for setting a background picture of an unlocking interface of an application provided by yet another embodiment of the present disclosure.

Alternatively, in another embodiment of the present disclosure, as shown in FIG. 5, the method for setting a background picture of an unlocking interface of an application provided by embodiments of the present disclosure may include: acts at block S101, block S102, block S103a, block S103b, block S105, block S106, block S107 and block S104b, in which the acts at block S101, block S102, block S103a and block S103b are described in the method embodiment as shown in FIG. 1, which will not be described herein, the act at block S105 is described in the method embodiment as shown in FIG. 3, and the act at block S104b is a specific implementation of block S104 shown in FIG. 1. The acts at block S106, block S107 and block S104b will be described below in detail.

At block S101, a first icon file of an application to be unlocked is acquired.

At block S102, a scaling processing is performed on the first icon file of the application to be unlocked, so as to acquire a second icon file with a preset image size.

At block S103a, a transparent edge with a preset length is added to the second icon file, so as to acquire a picture having the transparent edge.

At block S103b, a Gaussian blur processing is performed on the picture having the transparent edge, so as to acquire a special effect picture having a blur effect.

At block S105, an alpha blending is performed on the special effect picture having the blur effect, so as to acquire a special effect picture having a transparent blur effect.

At block S106, a bottom layer picture is acquired.

Figure 6:
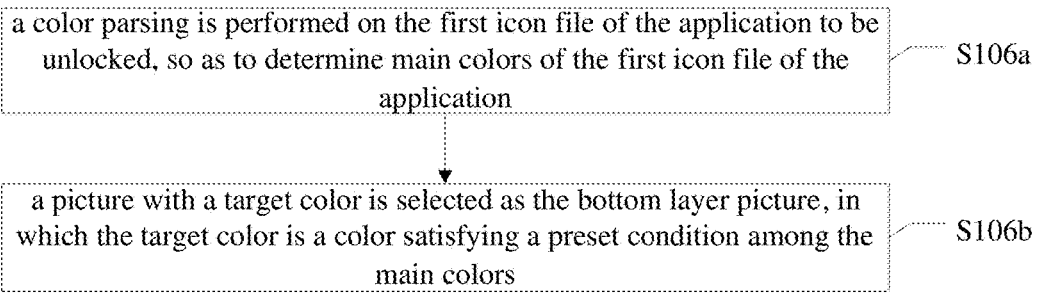
FIG. 6 is a flow chart illustrating an implementation of the act at block S106 provided by an embodiment of the present disclosure.

In a specific implementation of the present disclosure, as shown in FIG. 6, the act at block S106 may include followings.

At block S106a, a color parsing is performed on the first icon file of the application to be unlocked, so as to determine main colors of the first icon file of the application.

Alternatively, the act at block S106a may include: scaling-down the first icon file of the application to be unlocked to a present second size value, so as to acquire a scaled-down icon file; and performing a chromatic scanning on the scaled-down icon file from the outside in, so as to acquire the main colors of the first icon file.

In an implementation, the icon file of the application may be scaled-down to a size in which the main chromatics can be identified easily. In order to avoid a poor effect, it may be scanned from the outside in, and the main chromatics parsed from the colors having a high proportion may be configured as the main colors.

At block S106b, a picture with a target color is selected as the bottom layer picture, in which the target color is a color satisfying a preset condition among the main colors.

Since the icon files of the applications have different main chromatics, a same background color may not be consistent with all icons. For a utility of an overall visual effect, the parsed main chromatics of the applications may be applied to the background color.

Alternatively, the act at block S106b may include: performing a transformation from an RGB (Red-Green-Blue) chromatic space to an HUE (Hue-Saturation-Lightness/Brightness/Value) chromatic space on the main colors of the first icon file, so as to acquire a plurality of color codes; and selecting a picture having a color corresponding to a color code with a highest proportion as the bottom layer picture.

In an implementation, when the main chromatics are parsed, the color space is transformed from RGB to HUE to obtain color codes defined in HUE, and a color code with a highest proportion may be select from the corresponding color codes as the color of the bottom layer picture. It can avoid a poor overall visual effect due to too dark automatic selected color. In addition, a black list of color blocks can be set, for example color blocks such as black and white will not be used, and then a color code with a highest proportion may be select from the corresponding color codes as the color of the bottom layer picture.

At block S107, the special effect picture having the transparent blur effect is covered on the bottom layer picture, so as to generate a new special effect picture.

At block S104b, when the instruction for generating the unlocking interface of the application to be unlocked is detected, the new special effect picture relevant to the application to be unlocked currently is called, and partial content of a scaled-up new special effect picture is displayed as the background picture of the unlocking interface.

Figure 7:
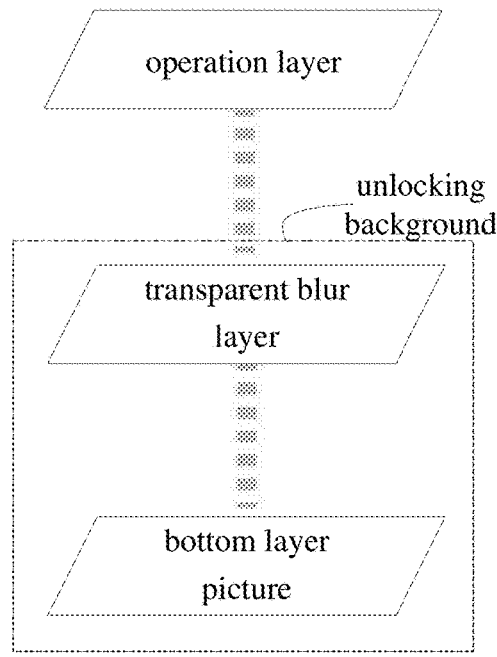
FIG. 7 is a schematic diagram illustrating a layer composition of an unlocking interface provided by an embodiment of the present disclosure.

When applying to an internet application unlocking product, the unlocking interface may be composed of three picture layers including an operation layer, a transparent blur layer and a bottom layer picture as shown in FIG. 7. The operation layer may include the unlocking inputting information such as a numerical password or gesture inputting information, the transparent blur layer is the special effect picture having the transparent blur effect as mentioned in the present disclosure, and the bottom layer picture is the bottom layer picture provided in the present disclosure. By setting the three picture layers, the icon file of the application selected by the user may be scaled-up, and processed through the Gaussian blur processing and the alpha blending. In a case that the user may identify the application to be unlocked through the unlocking background, a frosted glass displaying effect may also be realized.

Alternatively, in another embodiment of the present disclosure, the method for setting a background picture of an unlocking interface of an application provided by embodiments of the present disclosure may also include: identifying, after a slide operation for the unlocking interface is detected, a direction of the slide operation, so as to acquire an identified result; and moving the scaled-up special effect picture to replace the background picture of the unlocking interface according to the identified result.

For example, the user may slide the unlocking interface to left, such that the terminal device may identify that the direction of the slide operation is left.

In the present disclosure, the location of the blur icon may be changed with a physical direction of a gesture, such that an interaction between the user's gesture and the icon may be realized. In an implementation, the special effect picture in the interface including two layers may be moved along with the direction opposite to that of the slide operation, such that an effect of a linkage between the slide operation and the special effect picture may be realized. Alternatively, an offset of the location of the special effect picture in the interface having two layers may be: a sliding displacement* a preset scale value.

Corresponding to the method embodiment described above, the present disclosure also provides an apparatus for setting a background picture of an unlocking interface of an application.

Figure 8:
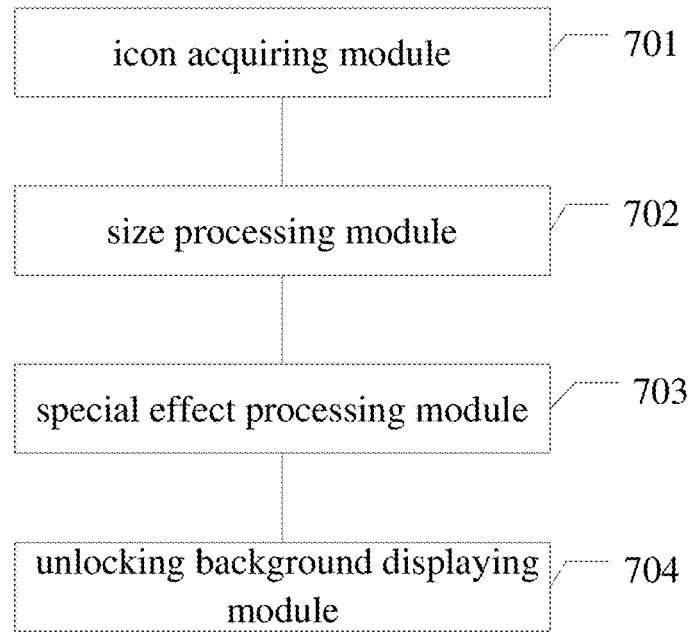
FIG. 8 is a block diagram of an apparatus for setting a background picture of an unlocking interface of an application provided by an embodiment of the present disclosure.

As shown in FIG. 8, the apparatus for setting a background picture of an unlocking interface of an application provided by an embodiment of the present disclosure may include: an icon acquiring module 701, configured to acquire a first icon file of an application to be unlocked; a size processing module 702, configured to perform a scaling processing on the first icon file of the application to be unlocked acquired by the icon acquiring module 701, so as to acquire a second icon file with a preset image size; a special effect processing module 703, configured to perform a special effect processing on the second icon file acquired by the size processing module 702, so as to acquire a special effect picture, and to store the special effect picture in a preset storing location; and an unlocking background displaying module 704, configured to call, when an instruction for generating the unlocking interface of the application to be unlocked is detected, a special effect picture relevant to the application to be unlocked currently, and to display partial content of a scaled-up special effect picture as the background picture of the unlocking interface.

Therefore, with the apparatus for setting a background picture of an unlocking interface of an application provided by embodiments of the present disclosure, after an icon file of an application to be unlocked is acquired, a scaling processing may be performed on the icon file of the application to be unlocked, so as to acquire a second icon file with a preset image size. A special effect processing may be performed on the second icon file, so as to acquire a special effect picture, and the special effect picture may be stored in a preset storing location. When an instruction for generating the unlocking interface of the application is detected, a special effect picture relevant to the application to be unlocked currently may be called, and partial content of a scaled-up special effect picture may be displayed as the background picture of the unlocking interface.

Compared to the prior art, with embodiments of the present disclosure, a picture relevant to an application to be unlocked can be used as an unlocking background of an unlocking information inputting interface of the application. The user is able to determine the application to be unlocked currently according to only the unlocking information inputting interface. Further, with the embodiments of the present disclosure, a special effect processing can be performed on the picture relevant to the application. By using a picture having a special effect as the unlocking background, the user is provided with a viewing-friendly unlocking interface. Furthermore, the processed special effect picture can be pre-stored, and when the background of the unlocking interface needs to be displayed, the special effect picture may be called directly, such that the resource-consuming problem when performing the blur processing in real time may be solved.

Alternatively, in another embodiment of the present disclosure, the size processing module 702 is specifically configured to acquire a standard image by using a Bitmap function, in which, a size value of the standard image equals to a preset first size value; and to scale the first icon file of to the standard image, so as to acquire the second icon file with the preset image size.

Alternatively, in another embodiment of the present disclosure, the preset first size value may include: a length value and a width value of a picture, in which the length value equals to the width value.

Alternatively, in another embodiment of the present disclosure, the special effect processing module 703 is specifically configured to add a transparent edge with a preset length to the second icon file, so as to acquire a picture having the transparent edge; and to perform a Gaussian blur processing on the picture having the transparent edge, so as to acquire a special effect picture having a blur effect.

Figure 9:
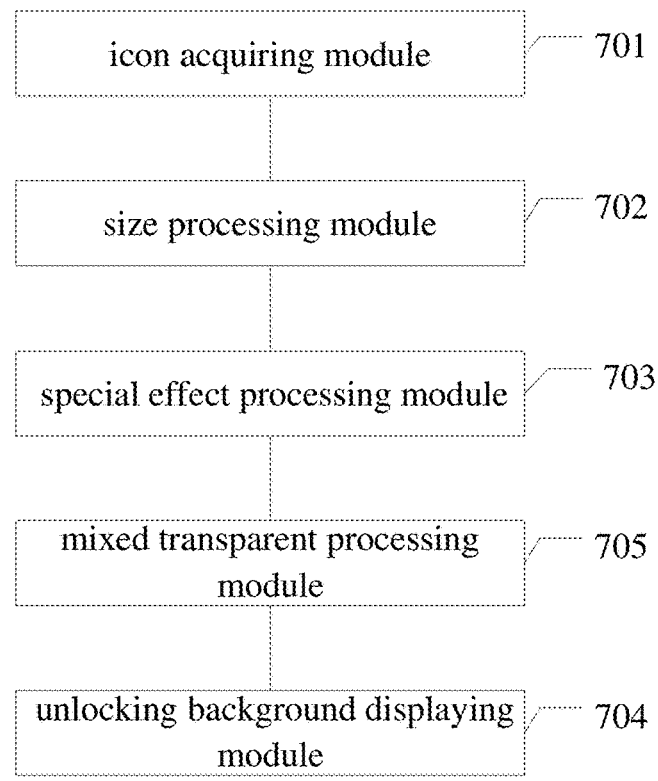
FIG. 9 is a block diagram of an apparatus for setting a background picture of an unlocking interface of an application provided by another embodiment of the present disclosure.

Alternatively, in another embodiment of the present disclosure, as shown in FIG. 9, the apparatus for setting a background picture of an unlocking interface of an application may include: an icon acquiring module 701, configured to acquire a first icon file of an application to be unlocked; a size processing module 702, configured to perform a scaling processing on the first icon file of the application to be unlocked acquired by the icon acquiring module 701, so as to acquire a second icon file with a preset image size; a special effect processing module 703, configured to add a transparent edge with a preset length to the second icon file acquired by the size processing module 702, so as to acquire a picture having the transparent edge, and to perform a Gaussian blur processing on the picture having the transparent edge, so as to acquire a special effect picture having a blur effect; a mixed transparent processing module 705, configured to perform an alpha blending on the special effect picture having the blur effect acquired by the special effect processing module 703, so as to acquire a special effect picture having a transparent blur effect; and an unlocking background displaying module 704, configured to call, when the instruction for generating the unlocking interface of the application to be unlocked is detected, a special effect picture relevant to the application to be unlocked currently and having the transparent blur effect, and to display partial content of a scaled-up special effect picture as the background picture of the unlocking interface.

Figure 10:
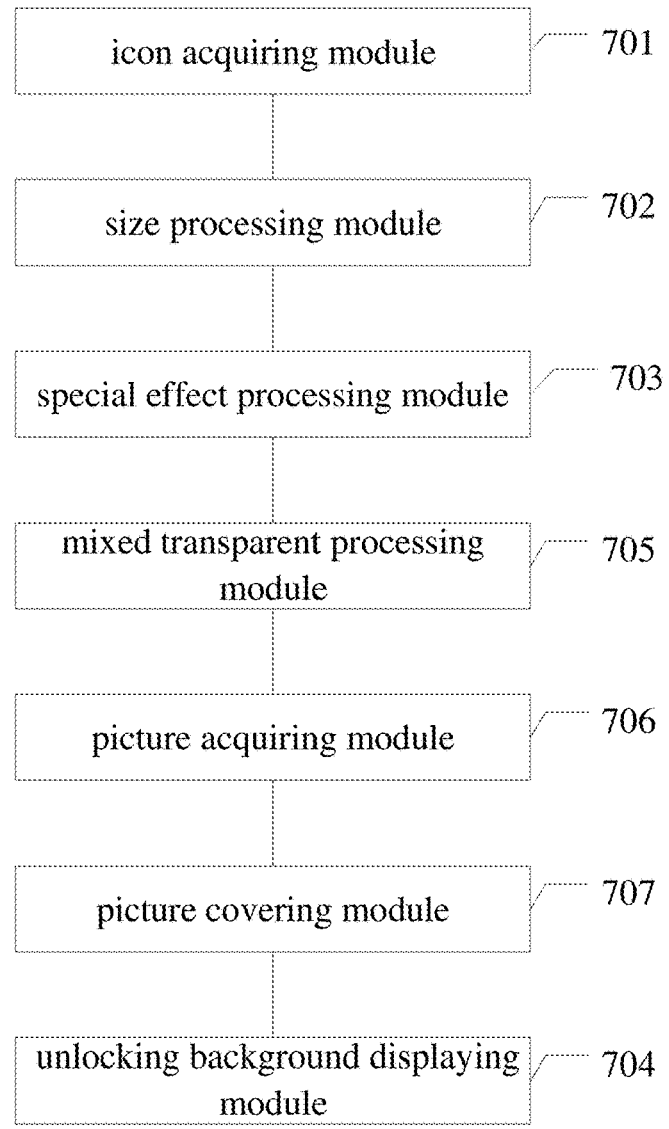
FIG. 10 is a block diagram of an apparatus for setting a background picture of an unlocking interface of an application provided by yet another embodiment of the present disclosure.

Alternatively, in another embodiment of the present disclosure, as shown in FIG. 10, the apparatus for setting a background picture of an unlocking interface of an application may include: an icon acquiring module 701, configured to acquire a first icon file of an application to be unlocked; a size processing module 702, configured to perform a scaling processing on the first icon file of the application to be unlocked acquired by the icon acquiring module 701, so as to acquire a second icon file with a preset image size; a special effect processing module 703, configured to add a transparent edge with a preset length to the second icon file acquired by the size processing module 702, so as to acquire a picture having the transparent edge, and to perform a Gaussian blur processing on the picture having the transparent edge, so as to acquire a special effect picture having a blur effect; a mixed transparent processing module 705, configured to perform an alpha blending on the special effect picture having the blur effect acquired by the special effect processing module 703, so as to acquire a special effect picture having a transparent blur effect; a picture acquiring module 706, configured to acquire a bottom layer picture; and a picture covering module 707, configured to cover the special effect picture having the transparent blur effect acquired by the mixed transparent processing module 705 on the bottom layer picture acquired by the picture acquiring module 706, so as to generate a new special effect picture; and an unlocking background displaying module 704, configured to call, when the instruction for generating the unlocking interface of the application to be unlocked is detected, the new special effect picture relevant to the application to be unlocked currently, and to display partial content of a scaled-up new special effect picture as the background picture of the unlocking interface.

Figure 11:
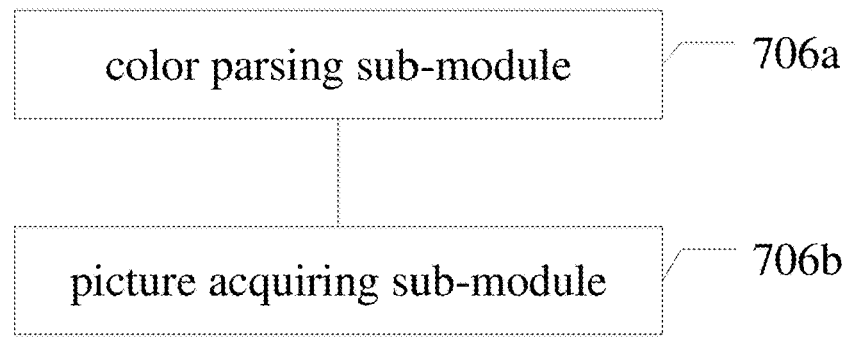
FIG. 11 is a block diagram of a picture acquiring module 706 provided by an embodiment of the present disclosure.

Alternatively, in another embodiment of the present disclosure, as shown in FIG. 11, the picture acquiring module 706 may include: a color parsing sub-module 706a, configured to perform a color parsing on the first icon file of the application to be unlocked, so as to determine main colors of the first icon file; and a picture acquiring sub-module 706b, configured to select a picture with a target color as the bottom layer picture, in which the target color is a color satisfying a preset condition among the main colors.

Alternatively, in another embodiment of the present disclosure, the color parsing sub-module 706a is specifically configured to: scale-down the first icon file of the application to be unlocked to a present second size value, so as to acquire a scaled-down icon file; and to perform a chromatic scanning on the scaled-down icon file from the outside in, so as to acquire the first icon file.

Alternatively, in another embodiment of the present disclosure, the picture acquiring sub-module 706b is specifically configured to: perform a transformation from an RGB chromatic space to an HUE chromatic space on the main colors of the first icon file, so as to acquire a plurality of color codes; and to select a picture having a color corresponding to a color code with a highest proportion as the bottom layer picture.

Alternatively, in another embodiment of the present disclosure, based on any of the above mentioned embodiments of the present disclosure, the apparatus for setting a background picture of an unlocking interface of an application may further include an unlocking background replacing module.

The unlocking background replacing module is configured to identify, after a slide operation for the unlocking interface is detected, a direction of the slide operation, so as to acquire an identified result; and to move the scaled-up special effect picture to replace the background picture of the unlocking interface according to the identified result.

Corresponding to the above-described method and apparatus embodiments, the present disclosure also provides an electronic device.

The electronic device may include: a housing, a processor, a memory, a display, a circuit board and a power supply circuit, in which the circuit board is disposed in an inner space enclosed by the housing, the processor and the memory are both mounted on the circuit board; the power supply circuit supplies power to the circuits or components of the electronic device; the memory stores executable program code; and the processor executes a program corresponding to the executable program code by reading the executable program code stored in the memory, so as to perform following steps: acquiring a first icon file of an application to be unlocked; performing a scaling processing on the first icon file of the application to be unlocked, so as to acquire a second icon file with a preset image size; performing a special effect processing on the second icon file, so as to acquire a special effect picture, and storing the special effect picture in a preset storing location; and calling, when an instruction for generating the unlocking interface of the application to be unlocked is detected, a special effect picture relevant to the application to be unlocked currently, and displaying partial content of a scaled-up special effect picture as the background picture of the unlocking interface.

There are various implementations of the electric device, including but not limited to the followings.

(1) a mobile communication device, having a mobile communication function, a main object of which is to provide speech and data communication, such as: a smart phone (such as an iPhone), a multi-media phone, a multi-functional phone and a low-end phone and the like.

(2) an ultra mobile personal computing device, belonging to a personal computer, having a computing and processing function and a mobile internet access function, such as: a PDA, an MID, an UMPC and the like, such as an iPod.

(3) a portable entertainment device, being able to display and play multi-media content, including: audio or video player (such as an iPod), a handheld game player, an e-book, a smart toy and a portable vehicle navigation system.

(4) other electronic device having a data interacting function.

The description of the apparatus embodiments is simple since the principle of which is similar to that of the method embodiments, and regarding the relevant parts, reference can be made to the corresponding part of the description of the method embodiments.

For convenience of description, the apparatus is described according to carious modules divided by functions. Of course, when implementing the present disclosure, the functions of the various modules may be realized by one or more software and/or hardware.

In order to realize the above objects, embodiments of the present disclosure also provide a storage medium, configured to store an application program, the application program is configured to execute the method for setting a background picture of an unlocking interface of an application according to the present disclosure at running time. The method for setting a background picture of an unlocking interface of an application according to the present disclosure may include: acquiring a first icon file of an application to be unlocked; performing a scaling processing on the first icon file of the application to be unlocked, so as to acquire a second icon file with a preset image size; performing a special effect processing on the second icon file, so as to acquire a special effect picture, and storing the special effect picture in a preset storing location; and calling, when an instruction for generating the unlocking interface of the application to be unlocked is detected, a special effect picture relevant to the application to be unlocked currently, and displaying partial content of a scaled-up special effect picture as the background picture of the unlocking interface.

In order to realize the above objects, embodiments of the present disclosure also provide an application program, the application program is configured to execute the method for setting a background picture of an unlocking interface of an application according to the present disclosure at running time. The method for setting a background picture of an unlocking interface of an application according to the present disclosure may include: acquiring a first icon file of an application to be unlocked; performing a scaling processing on the first icon file of the application to be unlocked, so as to acquire a second icon file with a preset image size; performing a special effect processing on the second icon file, so as to acquire a special effect picture, and storing the special effect picture in a preset storing location; and calling, when an instruction for generating the unlocking interface of the application to be unlocked is detected, a special effect picture relevant to the application to be unlocked currently, and displaying partial content of a scaled-up special effect picture as the background picture of the unlocking interface.

In should be noted that, in this description, relation terms such as first and second and the like is merely used to distinguish an object or operation from another object or operation, and it is not necessary to require or imply that there is any real relations or order among these objects or operations. Furthermore, terms "comprise", "include" or any other modifications are aim at covering non-exclusive "include", such that a process, a method, a term or a device including a series of elements also includes other elements which are not listed definitely. Without further limitation, an element defined by a sentence "include a . . . " may not exclusive of other same elements included in the process, the method, the term or the device including the said element.

Each embodiment in the specification is described in the progressive manner and illustrates in emphasis what is different from the other embodiments, and the same or similar parts in the embodiments are just references to each other. With respect to the system embodiment of the present disclosure, since the system corresponds to the method embodiment, the description is relatively simple, and for the relevant part, reference is made to the part of description of the method embodiment.

It would be understood by those skilled in the art that all or a part of the steps carried by the method in the above-described embodiments may be completed by relevant hardware instructed by a program. The program may be stored in a computer readable storage medium. The storage medium described herein may be: ROM/RAM, a magnetic disk, an optical disk and the like.

The present disclosure has been described with reference to the preferred embodiments, which should not be understood as limitation of the scope of the present disclosure. Various changes and modifications of the present disclosure may be made without departing from the spirit and scope of the present disclosure should be included in the scope of the present disclosure.

What is claimed is:

1. A method for setting a background picture of an unlocking interface of an application, comprising:

acquiring a first icon file of an application to be unlocked;

performing a scaling processing on the first icon file of the application to be unlocked, so as to acquire a second icon file with a preset image size;

performing a special effect processing on the second icon file, so as to acquire a special effect picture, and storing the special effect picture in a preset storing location; and calling, when an instruction for generating the unlocking interface of the application to be unlocked is detected, a special effect picture relevant to the application to be unlocked currently, scaling-up the special effect picture relevant to the application to be unlocked currently to acquire a first scaled-up special effect picture and displaying partial content of the first scaled-up special effect picture as the background picture of the unlocking interface.

2. The method according to claim 1, wherein performing a scaling processing on the first icon file of the application to be unlocked, so as to acquire the second icon file with the preset image size comprises:

acquiring a standard image by using a Bitmap function, in which, a size value of the standard image equals to a preset first size value; and scaling the first icon file to the standard image, so as to acquire the second icon file with the preset image size.

3. The method according to claim 1, wherein the preset first size value comprises:

a length value and a width value of a picture, in which the length value equals to the width value.

4. The method according to claim 1, wherein, performing a special effect processing on the second icon file, so as to acquire the special effect picture comprises:

adding a transparent edge with a preset length to the second icon file, so as to acquire a picture having the transparent edge; and performing a Gaussian blur processing on the picture having the transparent edge, so as to acquire a special effect picture having a blur effect.

5. The method according to claim 4, wherein after performing a Gaussian blur processing on the picture having the transparent edge, so as to acquire the special effect picture having the blur effect, the method further comprises:

performing an alpha blending on the special effect picture having the blur effect, so as to acquire a special effect picture having a transparent blur effect; and calling, when the instruction for generating the unlocking interface of the application to be unlocked is detected, a special effect picture relevant to the application to be unlocked currently, scaling-up the special effect picture relevant to the application to be unlocked currently to acquire the first scaled-up special effect picture and displaying partial content of the first scaled-up special effect picture as the background picture of the unlocking interface comprises:

calling, when the instruction for generating the unlocking interface of the application to be unlocked is detected, a special effect picture relevant to the application to be unlocked currently and having the transparent blur effect, scaling-up the special effect picture relevant to the application to be unlocked currently and having the transparent blur effect to acquire a second scaled-up special effect picture and displaying partial content of the second scaled-up special effect picture as the background picture of the unlocking interface.

6. The method according to claim 4, wherein after performing a Gaussian blur processing on the picture having the transparent edge, so as to acquire the special effect picture having the blur effect, the method further comprises:

performing an alpha blending on the special effect picture having the blur effect, so as to acquire a special effect picture having a transparent blur effect;

acquiring a bottom layer picture; and covering the special effect picture having the transparent blur effect on the bottom layer picture, so as to generate a new special effect picture; and calling, when the instruction for generating the unlocking interface of the application to be unlocked is detected, a special effect picture relevant to the application to be unlocked currently, scaling-up the special effect picture relevant to the application to be unlocked currently to acquire the first scaled-up special effect picture and displaying partial content of the first scaled-up special effect picture as the background picture of the unlocking interface comprises:

calling, when the instruction for generating the unlocking interface of the application to be unlocked is detected, the new special effect picture relevant to the application to be unlocked currently, scaling-up the new special effect picture relevant to the application to be unlocked currently to acquire a third scaled-up special effect picture and displaying partial content of the third scaled-up special effect picture as the background picture of the unlocking interface.

7. The method according to claim 6, wherein acquiring the bottom layer picture comprises:

performing a color parsing on the first icon file of the application to be unlocked, so as to determine main colors of the first icon file; and selecting a picture with a target color as the bottom layer picture, in which the target color is a color satisfying a preset condition among the main colors.

8. The method according to claim 7, wherein performing a color parsing on the first icon file of the application to be unlocked, so as to determine main colors of the first icon file comprises:

scaling-down the first icon file of the application to be unlocked to a present second size value, so as to acquire a scaled-down icon file; and performing a chromatic scanning on the scaled-down icon file from the outside in, so as to acquire the main colors of the first icon file.

9. The method according to claim 8, wherein selecting the picture with the target color as the bottom layer picture comprises:

performing a transformation from an RGB (Red-Green-Blue) chromatic space to a HUE (Hue-Saturation-Lightness/Brightness/Value) chromatic space on the main colors of the first icon file, so as to acquire a plurality of color codes; and selecting a picture having a color corresponding to a color code with a highest proportion as the bottom layer picture.

10. The method according to claim 1, wherein after displaying partial content of the first scaled-up special effect picture as the background picture of the unlocking interface, the method further comprises:

identifying, after a slide operation for the unlocking interface is detected, a direction of the slide operation, so as to acquire an identified result; and moving the first scaled-up special effect picture to replace the background picture of the unlocking interface according to the identified result.

11. An apparatus for setting a background picture of an unlocking interface of an application, wherein the apparatus comprises a non-transitory computer-readable medium comprising computer-executable instructions stored thereon, and an instruction execution system which is configured by the computer-executable instructions to implement at least one of:
an icon acquiring module, configured to acquire a first icon file of an application to be unlocked;
a size processing module, configured to perform a scaling processing on the first icon file of the application to be unlocked acquired by the icon acquiring module, so as to acquire a second icon file with a preset image size;
a special effect processing module, configured to perform a special effect processing on the second icon file acquired by the size processing module, so as to acquire a special effect picture, and to store the special effect picture in a preset storing location; and
an unlocking background displaying module, configured to call, when an instruction for generating the unlocking interface of the application to be unlocked is detected, a special effect picture relevant to the application to be unlocked currently, to scale-up the special effect picture relevant to the application to be unlocked currently to acquire a first scaled-up special effect picture and to display partial content of the first scaled-up special effect picture as the background picture of the unlocking interface.

12. The apparatus according to claim 11, wherein the size processing module is further configured to: acquire a standard image by using a Bitmap function, in which, a size value of the standard image equals to a preset first size value; and to scale the first icon file to the standard image, so as to acquire the second icon file with the preset image size.

13. The apparatus according to claim 11, wherein the special effect processing module is further configured to add a transparent edge with a preset length to the second icon file, so as to acquire a picture having the transparent edge; and to perform a Gaussian blur processing on the picture having the transparent edge, so as to acquire a special effect picture having a blur effect.

14. The apparatus according to claim 13, further comprising: a mixed transparent processing module, configured to perform an alpha blending on the special effect picture having the blur effect acquired by the special effect processing module, so as to acquire a special effect picture having a transparent blur effect;
wherein,
the unlocking background displaying module is further configured to: call, when the instruction for generating the unlocking interface of the application to be unlocked is detected, a special effect picture relevant to the application to be unlocked currently and having the transparent blur effect, to scale-up the special effect picture relevant to the application to be unlocked currently and having the transparent blur effect to acquire a second scaled-up special effect picture and to display partial content of the second scaled-up special effect picture as the background picture of the unlocking interface.

15. The apparatus according to claim 13, further comprising:
a mixed transparent processing module, configured to perform an alpha blending on the special effect picture having the blur effect, so as to acquire a special effect picture having a transparent blur effect;
a picture acquiring module, configured to acquire a bottom layer picture; and
a picture covering module, configured to cover the special effect picture having the transparent blur effect acquired by the mixed transparent processing module on the bottom layer picture acquired by the picture acquiring module, so as to generate a new special effect picture;
wherein,
the unlocking background displaying module is further configured to: call, when the instruction for generating the unlocking interface of the application to be unlocked is detected, the new special effect picture relevant to the application to be unlocked currently, to scale-up the new special effect picture relevant to the application to be unlocked currently to acquire a third scaled-up special effect picture and to display partial content of the third scaled-up special effect picture as the background picture of the unlocking interface.

16. The apparatus according to claim 15, wherein the picture acquiring module comprises:
a color parsing sub-module, configured to perform a color parsing on the first icon file of the application to be unlocked, so as to determine main colors of the first icon file; and
a picture acquiring sub-module, configured to select a picture with a target color as the bottom layer picture, in which the target color is a color satisfying a preset condition among the main colors.

17. The apparatus according to claim 16, wherein the color parsing sub-module is further configured to: scale-down the first icon file of the application to be unlocked to a present second size value, so as to acquire a scaled-down icon file; and to perform a chromatic scanning on the scaled-down icon file from the outside in, so as to acquire the main colors of the first icon file.

18. The apparatus according to claim 17, wherein the picture acquiring sub-module is further configured to: perform a transformation from an RGB (Red-Green-Blue) chromatic space to a HUE (Hue-Saturation-Lightness/Brightness/Value) chromatic space on the main colors of the first icon file, so as to acquire a plurality of color codes; and to select a picture having a color corresponding to a color code with a highest proportion as the bottom layer picture.

19. The apparatus according to claim 11, further comprising:
an unlocking background replacing module, configured to identify, after a slide operation for the unlocking interface is detected, a direction of the slide operation, so as to acquire an identified result; and to move the scaled-up special effect picture to replace the background picture of the unlocking interface according to the identified result.

20. An electronic device, comprising a housing, a processor, a memory, a display, a circuit board and a power supply circuit, wherein the circuit board is disposed in an inner space enclosed by the housing, the processor and the memory are both mounted on the circuit board; the power supply circuit supplies power to the circuits or components of the electronic device; the memory stores executable program code; and the processor executes a program corresponding to the executable program code by reading the executable program code stored in the memory, so as to perform following steps:
acquiring a first icon file of an application to be unlocked;

performing a scaling processing on the first icon file of the application to be unlocked, so as to acquire a second icon file with a preset image size;

performing a special effect processing on the second icon file, so as to acquire a special effect picture, and storing the special effect picture in a preset storing location; and calling, when an instruction for generating the unlocking interface of the application to be unlocked is detected, a special effect picture relevant to the application to be unlocked currently, scaling-up the special effect picture relevant to the application to be unlocked currently to acquire a first scaled-up special effect picture and displaying partial content of the first scaled-up special effect picture as the background picture of the unlocking interface.

* * * * *